United States Patent [19]
Miyashita

[11] Patent Number: 5,118,141
[45] Date of Patent: Jun. 2, 1992

[54] UNION JOINT

[75] Inventor: Tomio Miyashita, Yokohama, Japan

[73] Assignee: Sanko Kogyo Kabushiki Kaisha, Tokyo, Japan

[21] Appl. No.: 605,259

[22] Filed: Oct. 26, 1990

[30] Foreign Application Priority Data

Dec. 7, 1989 [JP] Japan ............................ 1-141841[U]
Apr. 3, 1990 [JP] Japan ............................ 2-36074[U]

[51] Int. Cl.$^5$ ............................................ F16L 19/00
[52] U.S. Cl. .................................... 285/336; 285/354; 285/351; 285/917; 285/918
[58] Field of Search .............. 285/336, 354, 331, 352, 285/384, 386, 351, 917, 281, 910, 918, 353, 379, 349; 277/236, 167.5, 207 A

[56] References Cited

U.S. PATENT DOCUMENTS

| | | | |
|---|---|---|---|
| 2,705,651 | 11/1950 | Myers | 285/354 |
| 2,878,041 | 3/1959 | Hobbs | 285/336 |
| 4,114,907 | 9/1978 | Abbes et al. | 285/917 X |
| 4,603,892 | 8/1986 | Abbes et al. | 285/336 |
| 4,606,564 | 8/1986 | Kurachi | 285/354 X |
| 4,640,530 | 2/1987 | Abbes et al. | 285/336 |
| 4,811,976 | 3/1989 | Yagisawa | 285/917 X |

Primary Examiner—Dave W. Arola
Assistant Examiner—Timothy Aberle
Attorney, Agent, or Firm—Flynn, Thiel, Boutell & Tanis

[57] ABSTRACT

A union joint capable of perfectly hermetically connecting pipes so that a gas passing the pipes never leaks from the junction of the pipes even if the pressure of the gas is as high as 150 kg/cm$^2$. The union joint comprises a first sleeve hermetically joined to a pipe, a second sleeve hermetically joined to another pipe to be connected to the pipe joined to the first sleeve, one or a plurality of metallic gaskets placed between the respective sealing surfaces of the first and second sleeves so as to be compressed between the sealing surfaces of the first and second sleeves when the first and second sleeves are drawn axially toward each other, a coupling nut for drawing the first and second sleeves axially toward each other, and a thrust bearing interposed between the first sleeve and the coupling nut to allow the coupling nut to be rotated relative to the first sleeve. One of a plurality of annular grooves are formed at least in either the sealing surface of the first sleeve or the sealing surface of the second sleeve to receive the corresponding metallic gaskets. When compressed between the sealing surfaces, the metallic gasket is deformed in an elliptic cross section so that the metallic gasket and the bottom surface of the corresponding annular groove are in close contact with each other in a large contact area.

8 Claims, 10 Drawing Sheets

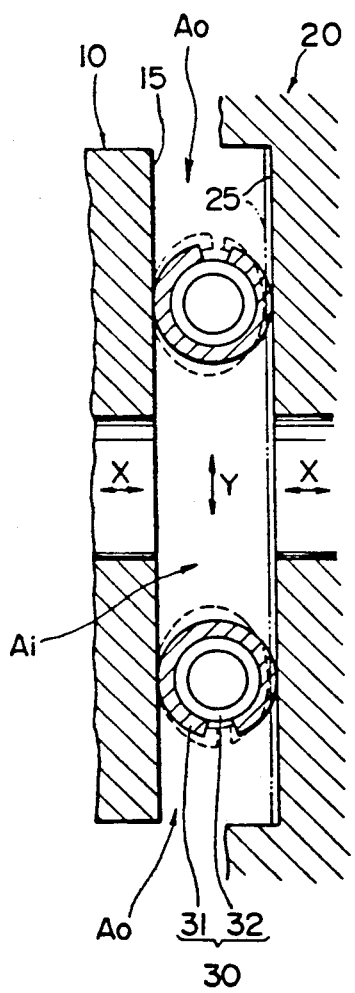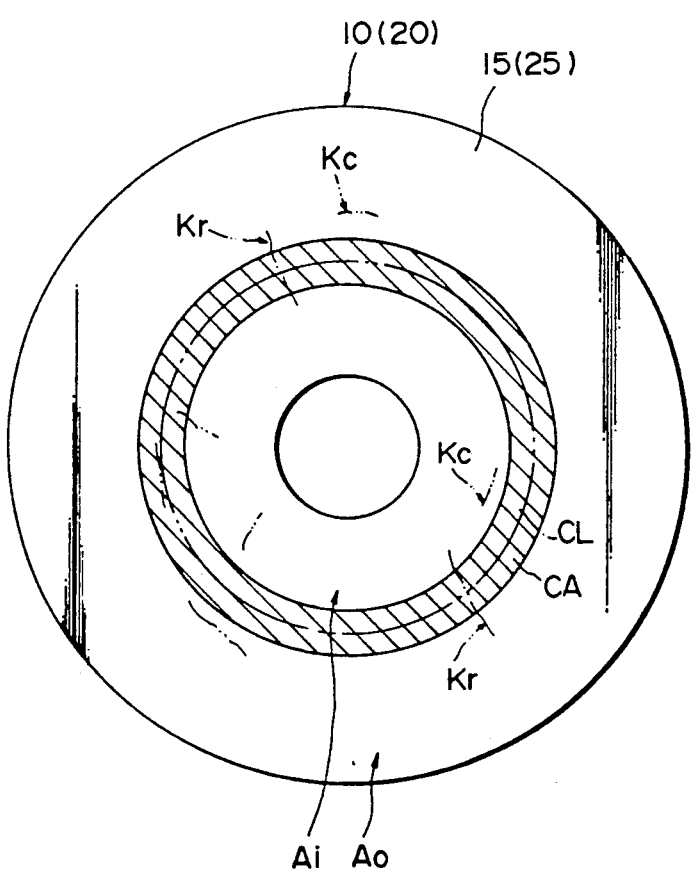
FIG. 10 PRIOR ART
FIG. 11 PRIOR ART

UNION JOINT

BACKGROUND OF THE INVENTION

1. Field of the Invention

The present invention relates to a union joint and, more specifically, to a union joint for use in semiconductor industries requiring perfectly sealed connection of pipes.

2. Prior Art

Semiconductor device manufacturing processes for manufacturing semiconductor devices, such as ICs and LSIs, are carried out in clean rooms in which elaborate precautions are employed to reduce dust particles and other contaminants in the air. A special gas for use in the clean room is supplied through piping from an external gas source. The special gas must be extremely pure and the existence of foreign gases, such as air, in the special gas must be perfectly obviated. Therefore, the piping for supplying the special gas must be formed of precision pipes and precision union joints for connecting the pipes. Union joints to be used in combination with high pressure vessels also must be capable of perfect sealing in view of safety.

The perfectly sealed connection of pipes by a conventional union joint may be attained by increasing pressure acting on a metallic gasket provided between the pipes. However, if an excessive torque is applied to the coupling ring to join pipes firmly, the pipes and a gasket interposed between the pipes are distorted torsionally, and hence the torque cannot be increased beyond a fixed limit.

The applicant of the present patent application proposed previously a union joint as shown in FIG. 9 incorporating a thrust bearing to transmit only an axial force from the inner surface of a coupling nut to one of two pipes and not to transmit torque from the inner surface of the coupling nut to the pipe. As shown in FIG. 9, the union joint consists of a first sleeve 10 attached in a sealed joint to a first pipe 1, a second sleeve 20 attached in a sealed joint to a second pipe 2, a metallic gasket 30 interposed between the sealing surface 15 of the first sleeve 10 and the sealing surface 25 of the second sleeve 20, a coupling nut 5 for axially drawing together the first sleeve 10 and the second sleeve 20 to join the first pipe 1 and the second pipe 2 hermetically, and a thrust bearing 8 placed between the inner bottom surface 6 of the coupling nut 5 and the shoulder of the first sleeve 10. When the coupling nut 5 is turned to draw together the first sleeve 10 and the second sleeve 20, hence the first pipe 1 and the second pipe 2, only an axial force acts on the first sleeve 10, so that the pipes 1 and 2 can be firmly joined together by applying a large torque to the coupling nut 5 without torsionally distoring the pipes 1 and 2 and the metallic gasket 30. In order to enhance the sealing effect of the union joint, the sealing surface 15 of the first sleeve 10 and the sealing surface 25 of the second sleeve 20 are mirror-finished and, to enhance the possibility of repetitive use, the sealing surfaces 15 and 25 are burnished. The metallic gasket 30 having excellent compressibility, capable of securing residual elasticity, capable of functioning without contaminating the gas and having excellent durability can be used repeatedly to meet economical requirements.

When the coupling nut 5 is turned to draw together the sleeves 10 and 20, the metallic gasket 30, which is in line contact with the sealing surfaces 15 and 25 of the sleeves 10 and 20 along contact lines CL, is squeezed elastically in a shape indicated by broken lines in FIG. 10 and is brought into surface contact with the sealing surfaces 15 and 25 of the sleeves 10 and 20 along contact areas CA as shown in FIG. 11. Thus, the sleeves 10 and 20 are perfectly hermetically joined together to isolate the inside space Ai enclosed by the sealing surfaces 15 and 25 and the metallic gasket 30 perfectly from the outside space Ao. In FIG. 9, indicated at 20a is an external thread formed on the second sleeve 20, and at 5a is an internal thread formed on the coupling nut 5 to be screwed on the second sleeve 20.

The reliability of this previously proposed union joint is not satisfactory. In some cases, the union joint is unable to prevent leakage when a high-pressure gas of a pressure on the order of 150 kg/cm$^2$ is passed through the union joint even if the sleeves 10 and 20 are drawn axially toward each other by an increased force and the components are finished in the highest possible accuracy.

Even if such union couplings are manufactured in a lot under quality control, some of the union couplings may be defective and the union joints may differ from each other in quality. Accordingly, causes of leakage and quality variation must be elucidated and techniques for eliminating such disadvantages must be developed.

Still further, if the metallic gasket 30 is located correctly between the respective sealing surfaces 15 and 25 of the sleeves 10 and 20, it is possible that the metallic gasket 30 protrudes partly into the passage between the pipes 1 and 2 to reduce the flow passage area. Accordingly, it is desired to develop a technique to locate the metallic gasket 30 properly between the respective sealing surfaces 15 and 25 of the sleeves 10 and 20.

SUMMARY OF THE INVENTION

Accordingly, it is an object of the present invention to provide a reliable union joint simple to handle, comprising parts not requiring specially high machining accuracy, not requiring specially high joining force and capable of being manufactured in a predetermined quality and of ensuring perfectly sealed connection of pipes.

To achieve the object, causes of imperfectly sealed connection of pipes were analyzed through the examination of imperfect union joints and it was found that invisible flaws formed in the sealing surface of either the first or second sleeve or in the sealing surfaces of both the first and second sleeves during manufacture or after manufacture cannot be covered with the metallic gasket and cause leakage. The mechanism of gas leakage due to the flaws formed in the sealing surfaces of the sleeves and the sealing function of the metallic gasket were examined closely. Procedure and results of such close examination of the causes of gas leakage will be described hereinafter.

Referring to FIG. 11, flaws formed in the sealing surfaces 15 (25) of the first sleeve 10 (the second sleeve 20) and classified roughly into circumferential flaws Kc extending in circumferential directions and radial flaws Kr extending in raidal directions. The flaws outside the contact area CA do not exert adverse effect on the sealing effects of the metallic gasket 30. The flaws extending across the contact area CA connect the inside space Ai and the outside space Ao and allows the gas to leak when the pressure of the gas is as high as 150 Kg/cm$^2$ even if the flaws are very slight ones. Most of the circumferential flaws Kc formed in the vicinity of the contact area CA can be included in the contact area CA by compressing the metallic gasket 30 to a high degree so that the contact area CA may be increased to the largest possible extent.

Since the radial flaws Kr extend substanitally perpendicularly to the contact area CA, the width of the contact area CA must be increased considerably to include the radial flaws Kr within the contact area CA. However, since the metallic gasket 30 is deformed elastically in radial directions in which the metallic gasket 30 is readily collapsible, it is impossible to enlarge the contact area CA sufficiently to include all the radial flaws Kr with the contact area CA even if the sleeves 10 and 20 are drawn axially toward each other by a very large force to compress the metallic gasket 30. Accordingly, gas leakage occurs through the radial flaws Kr which cannot be included within the contact area CA when a gas of a high pressure on the order of 150 kg/cm$^2$ is passed through the union joint.

Problems similar to those relating to the condition of the sealing surfaces 15 and 25 of the sleeves 10 and 20 occur also in the metallic gasket 30. It is impossible to include all the radial flaws in the metallic gasket 30 within the contact area CA.

In a first aspect of the present invention, a union joint is provided with a plurality of metallic gaskets of different diameters to increase the probability of inclusion of such radial flaws Kr within the contact area CA. In this configuration, a fairly large, perfectly sealed, annular space is formed between the two adjacent metallic gaskets.

In a second aspect of the present invention, annular grooves are formed at least in either the sealing surface of a first sleeve or the sealing surface of a second sleeve to locate the metallic gaskets correctly in assembling the union joint. When the sleeves are drawn axially toward each other, each metallic gasket is deformed elastically so as to expand radially within the annular groove, so that the metallic gasket and the surface of the annular groove are brought into surface contact in a considerably wide contact area, which increases the possibility of inclusion of radial flaws within the contact area.

Thus, according to the present invention, perfectly sealed connection of pipes can be achieved through the dextrous utilization of the elastic deformation of metallic gaskets without raising the machining accuracy of the components of the union joint and without excessively increasing the axial force for drawing together the sleeves.

The plurality of perfectly sealed annular spaces and the plurality of contact areas increase the possibility of sealing of radial flaws remarkably.

The annular gooves receiving the metallic gaskets increase the contact areas remarkably to enchance the sealing effect of the metallic gaskets, and ensure and facilitate the correct placement of the metallic gaskets in assembling the union joint.

The above and other objects, features and advantages of the present invention will become more apparent from the following description taken in conjunction with the accompanying drawings.

BRIEF DESCRIPTION OF THE DRAWINGS

FIG. 10 is a fragmentary longitudinal sectional view of assistance in explaining the sealing function of a metallic gasket of the union joint of FIG. 9; and FIG. 11 is a plan view of assistance in explaining the sealing function of the metallic gasket of FIG. 10.

PREFERRED EMBODIMENTS OF THE INVENTION

Figure 1:
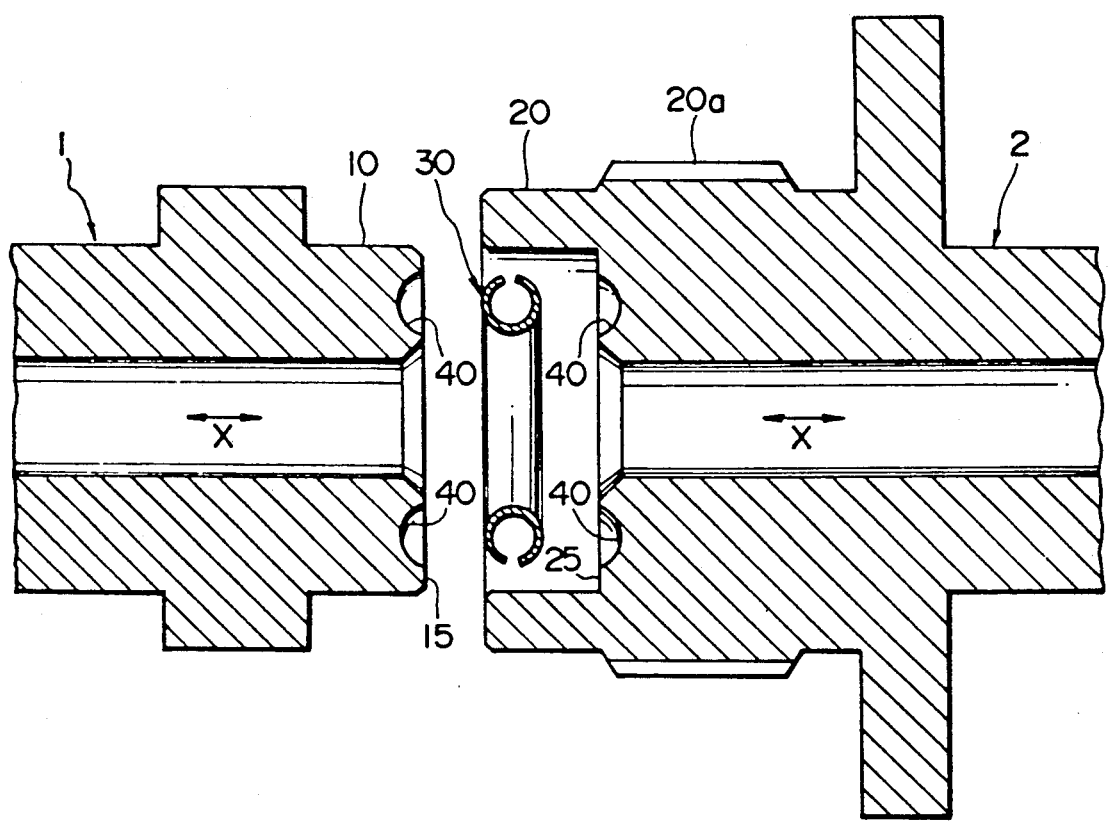
FIG. 1 is a longitudinal sectional view of a union joint in a first embodiment according to the present invention.
Figure 3:
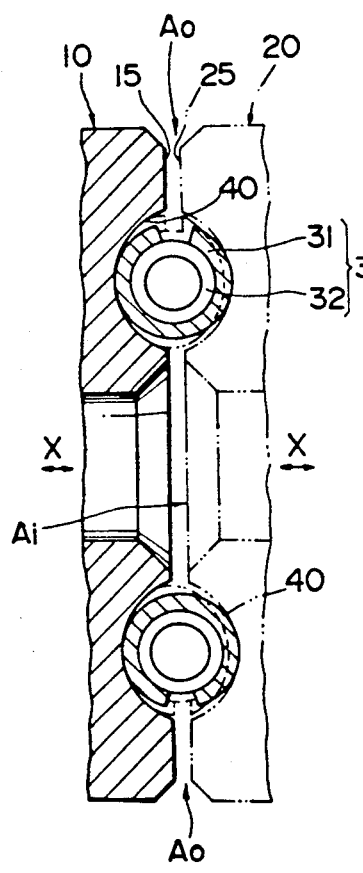
FIG. 3 is a plan view of assistance in explaining the sealing function of a metallic gasket of the union joint of FIG. 1.
Figure 2:
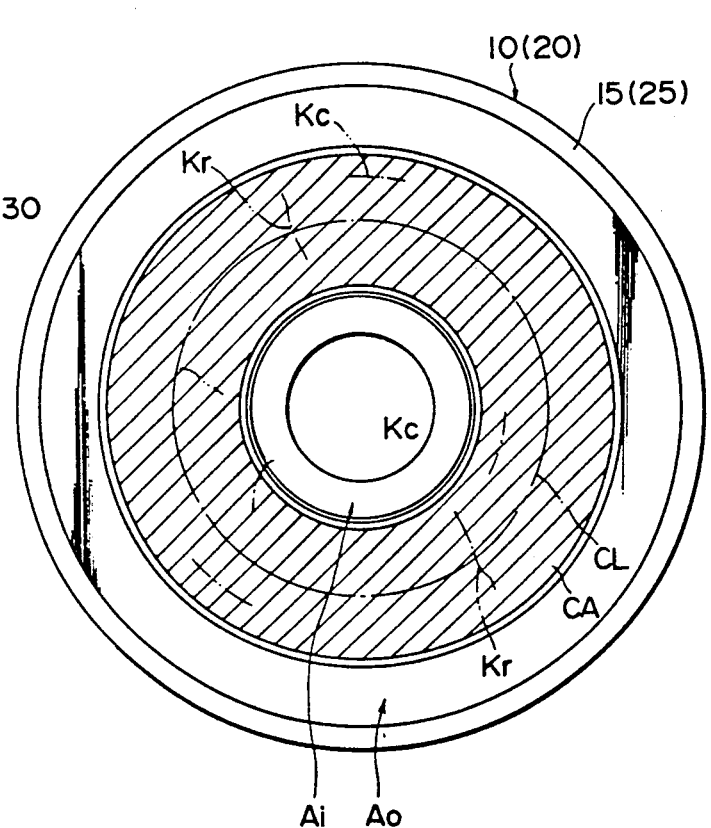
FIG. 2 is a fragmentary longitudinal sectional view of the union joint of FIG. 1.

First Embodiment (FIGS. 1 to 3)

Figure 9:
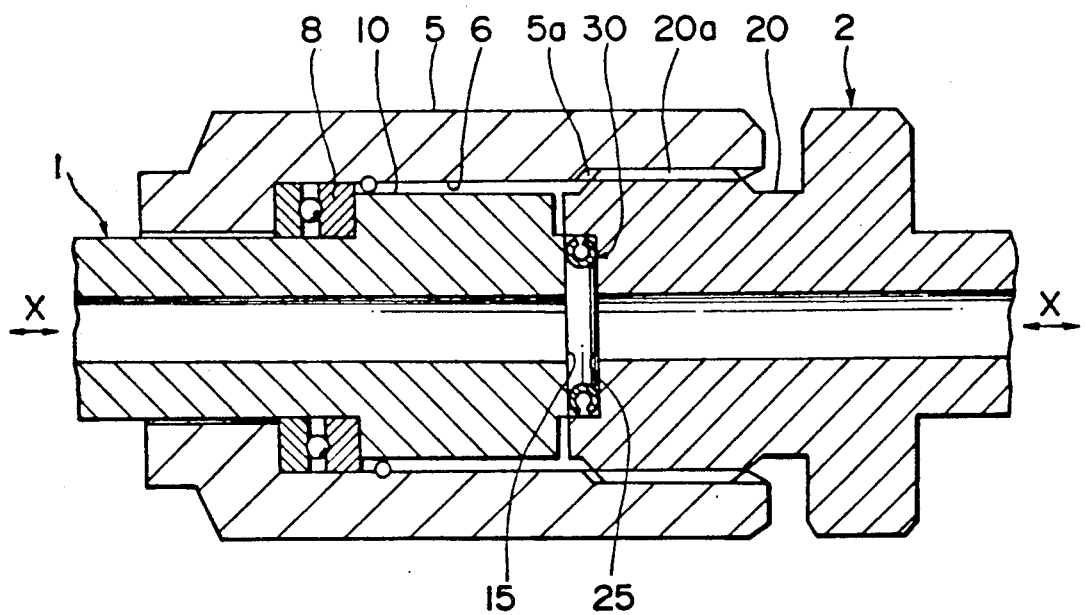
FIG. 9 is a longitudinal sectional view of a conventional union joint.
Figure 12:
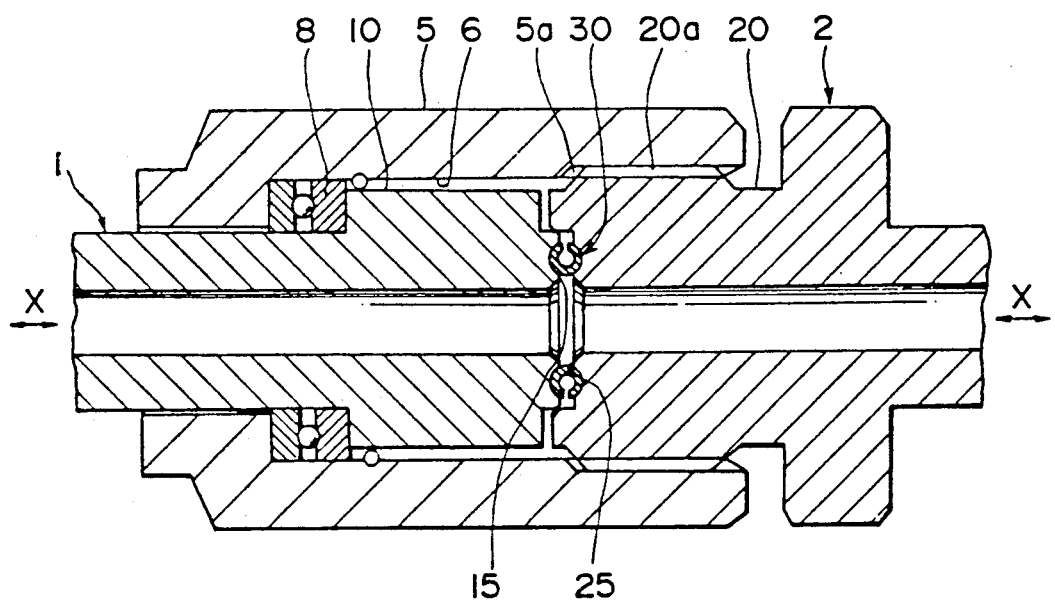
FIGS. 12 and 13 are longitudinal sectional views similar to FIG. 9 but incorporating therein the improved joints of FIGS. 1 and 3, respectively.
Figure 13:
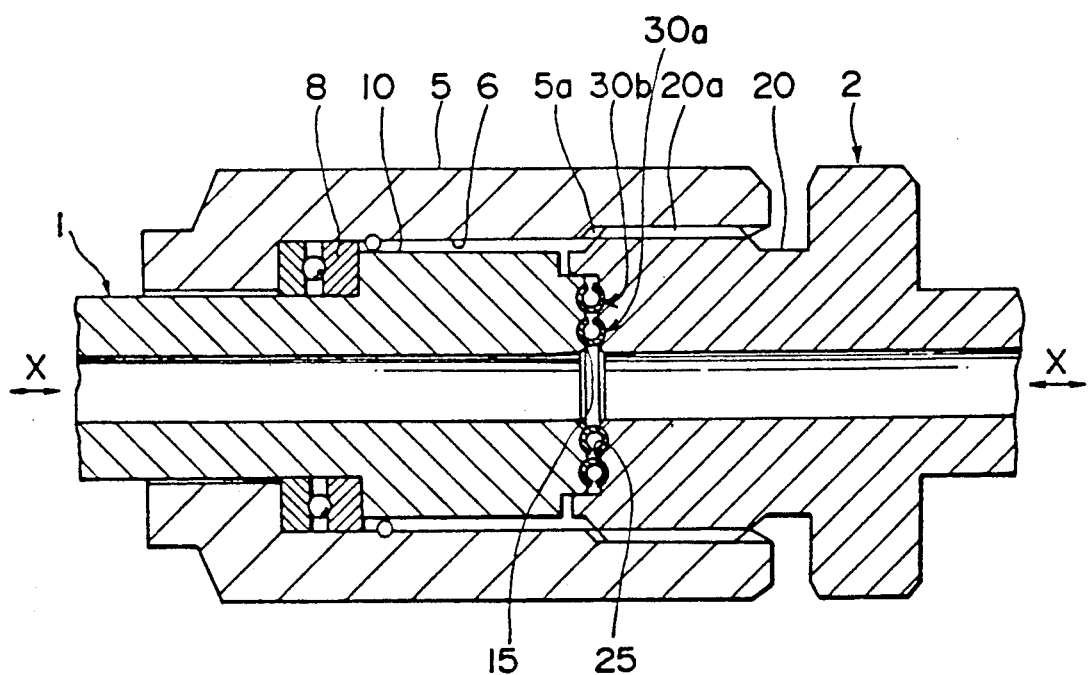

A union joint in a first embodiment according to the present invention will be described hereinafter with reference to FIGS. 1 to 3, in which parts like or corresponding to those previously described with reference to FIGS. 9 to 11 are denoted by the same reference characters and the description thereof will be omitted to avoid duplication.

The union joint in the first embodiment according to the present invention comprises a first sleeve 10, a second sleeve 20, a circular metallic gasket 30, a coupling nut and a thrust bearing. The functions and arrangement of the coupling nut and the thrust bearing are the same as those of the coupling nut 5 and the thrust bearing 8 of the conventional union coupling previously described with reference to FIG. 9, and hence the coupling nut and the thrust bearing are not shown in FIGS. 1 to 3 and the description thereof will be omitted.

Annular grooves 40 for receiving the metallic gasket 30 are formed respectively in the respective sealing surfaces 15 and 25 of the sleeves 10 and 20. The annular grooves 40 have a substantially semicircular cross section having a radius of curvature substantially equal to that of the outside circumference of the cross section of the metallic gasket 30 so that the circumference 31 of the metallic gasket is brought into entire contact with the bottom surfaces of the annular grooves 40 when the metallic gasket 30 is compressed between the respective sealing surfaces 15 and 25 of the sleeves 10 and 20.

The metallic gasket 30 is placed between the sleeves 10 and 20 so as to be seated in the annular grooves 40. The metallic gasket 30 consists of an outer shell 31 of a cross section resembling the letter C, and a spring 32 contained in the outer shell 31. The outer shell 31 is formed of a material having a relatively small hardness, such as nickel or aluminum. The spring 32 is formed of a resilient material, such as a stainless steel, having a hardness higher than that of the material forming the outer shell 31.

In assembling the union joint, the first sleeve 10 is magnetized by the magnetizing means proposed by the applicant of the present patent application in Japanese Patent Application No. 1-143465 to attract the metallic gasket 30 to the sleeve 10 so that the metallic gasket 30 is held firmly in the annular groove 40 formed in the sealing surface 15 of the first sleeve 10. Then, the sleeves 10 and 20 are placed axially opposite to each other, and then the first sleeve 10 is demagnetized. Subsequently, the sleeves 10 and 20 are drawn axially toward each other to compress the metallic gasket 30 between the respective sealing surfaces 15 and 25 of the sleeves 10 and 20 so that the metallic gasket 30 is compressed axially and expanded radially in a shape conforming to the shapes of the annular grooves 40 and, consequently, the outer shell 31 of the metallic gasket 30 is brought into entire contact with the bottom surfaces of the annular grooves 40 in a large contact area CA because the radius of the cross section of each annular groove 40 is substantially equal to that of the cross section of the outer shell 31 of the metallic gasket 30. Thus, the large contact ara CA is capable of including more radial flaws formed in the outer circumference of the metallic gasket 30 and the bottom surfaces of the annular groove 40, and hence the sealing effect of the metallic gasket 30 withstands a very high gas pressure on the order of 150 kg/cm$^2$.

Furthermore, the annular grooves 40 formed in the respective sealing surfaces 15 and 25 of the sleeves 10 and 20 enchance the sealing effect of the metallic gasket 30 even if the sleeves 10 and 20 are drawn axially toward each other by a relatively small axial force and the metallic gasket 30 is not deformed greatly. Accordingly, the union joint need not be formed in a very robust construction and the metallic gasket 30 can be used repeatedly.

Still further, since the annular groove 40 formed in the sealing surface 15 of the first sleeve 10 helps locating the metallic gasket 30 on the first sleeve 10, the union joint can readily be assembled even if the union joint is used for joining together pipes extended in a horizontal position.

In a modification, the annular groove 40 may be formed only in either the sealing surface 15 of the first sleeve 10 or the sealing surface 25 of the second sleeve 20.

The cross section of the annular grooves 40 may be of any suitable shape other than the semicircular shape provided that the metallic gasket 30 is able to be brought into firm contact with the bottom surfaces of the annular grooves 40.

In FIGS. 2 and 3, the symbols Ao, Ai, Kc, Kr, CA and CL have the same meanings as described above concerning FIGS. 10 and 11.

Figure 4:
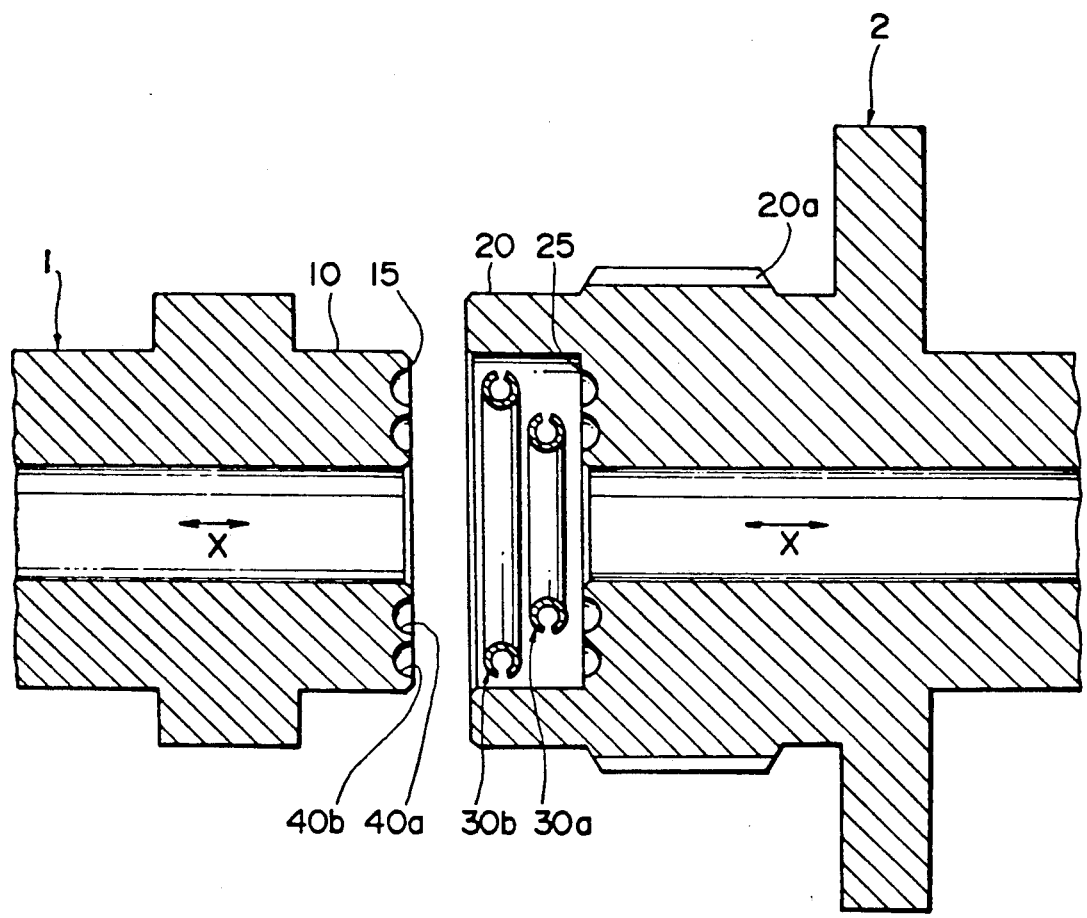
FIG. 4 is a longitudinal sectional view of a union joint in a second embodiment according to the present invention.
Figure 5:
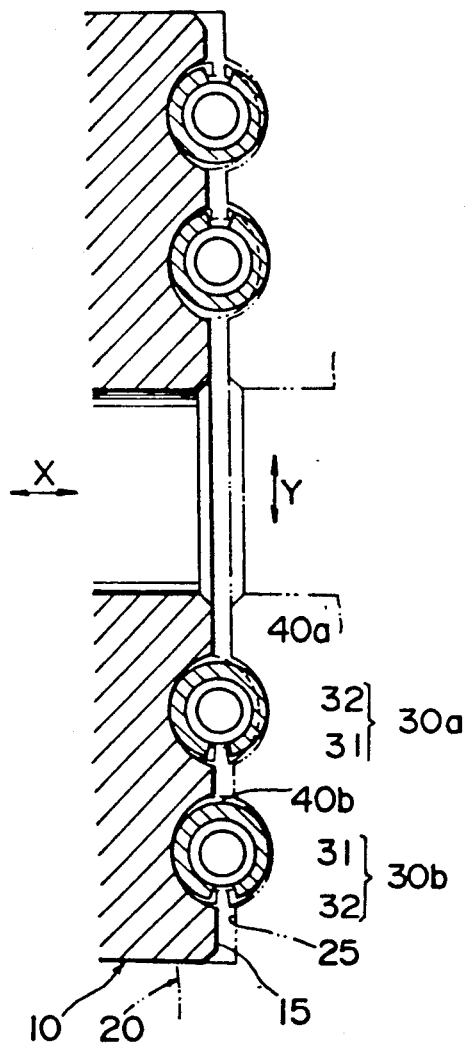
FIG. 5 is a fragmentary longitudinal sectional view of the union joint of FIG. 4.
Figure 6:
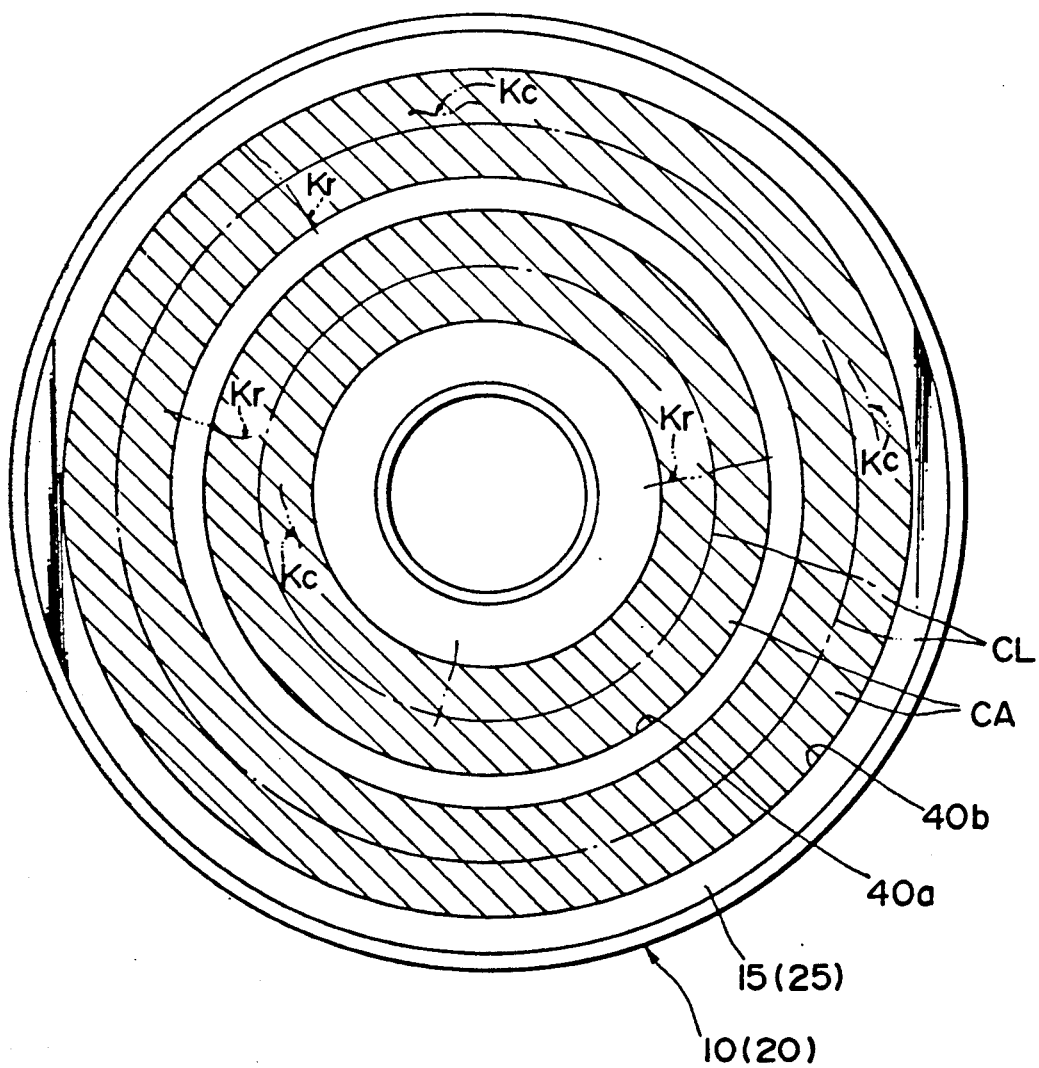
FIG. 6 is a plan view of assistance in explaining the sealing function of metallic gaskets of the union joint of FIG. 4.

Second Embodiment (FIGS. 4 to 6)

A sealing principle on which a union joint in a second embodiment according to the present invention is based will be described with reference to FIGS. 7 and 8 prior to the descrption of the union joint in the second embodiment.

Figure 7:
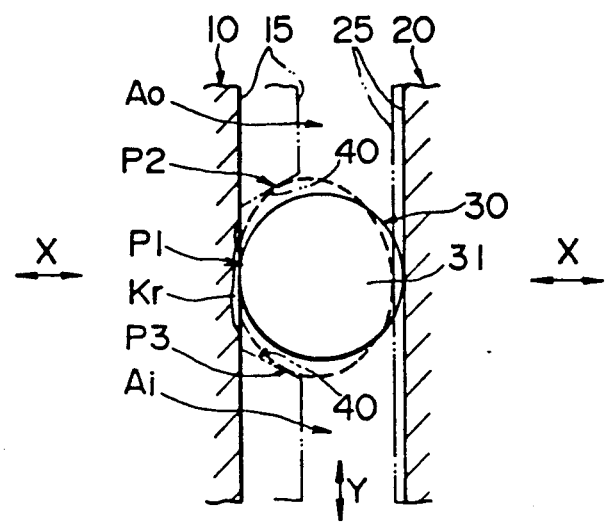
FIG. 7 is a fragmentary sectional view of assistance in explaining a principle on which the present invention is based.
Figure 8:
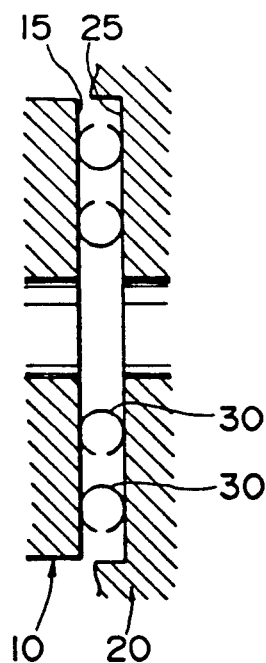
FIG. 8 is a schematic longitudinal sectional view of a union joint in the second embodiment according to the present invention.

Referring to FIGS. 7 and 8, when sleeves 10 and 20 are drawn axially toward each other, metallic gaskets 30 are compressed axially and expanded radially in an elliptic shape and are brought into close contact with the bottom surfaces of annular grooves 40 in portions P1, P2 and P3, so that each metallic gasket 30 is in contact with the bottom surface of the corresponding annular grooves in a large contact area CA.

The union joint in the second embodiment according to the present invention will be described hereinafter with reference to FIGS. 4 to 6, in which parts like or corresponding to those described with reference to FIGS. 1 to 3 are denoted by the same reference characters and the description thereof will be omitted to avoid duplication.

The union joint comprises a first sleeve 10 joined integrally to a pipe 1, a second sleeve 20 joined integrally to another pipe 2, a first metallic gasket 30a, a second metallic gasket 30b, a coupling nut and a thrust bearing. Since the functions and arrangement of the coupling nut and the thrust bearing are the same as those of the coupling nut 5 and the thrust bearing 8 of the conventional union coupling shown in FIGS. 9 to 11, the coupling nut and the thrust bearing are not shown in FIGS. 4 to 6 and the description thereof will be omitted.

Annular recesses 40a and 40b are formed coaxially in the respective sealing surfaces 15 and 25 of the sleeves 10 and 20 to receive the metallic gaskets 30a and 30b, respectively. The outside diameter of the first metallic gasket 30a is smaller than that of the second metallic gasket 30b. The construction, shape, materials and functions of each of the metallic gaskets 30a and 30b are the same as those of the metalic gasket 30 employed in the union joint in the first embodiment, and hence the descrption thereof will be omitted.

The annular grooves 40a and 40b are concentric with each other and are coaxial with the sleeves 10 and 20.

In assembling the union joint, the first sleeve 10 is magnetized by the magnetizing means proposed by the applicant of the present invention in Japanese Patent Application No. 1-143465, and then the metallic gaskets 30a and 30b are put in the corresponding annular grooves 40a and 40b of the first sleeve 10. The metallic gaskets 30a and 30b are held firmly in place in the corresponding annular grooves 40a and 40b by magnetic attraction. Then, the sleeves 10 and 20 are drawn axially toward each other, whereby the metallic gaskets 30a and 30b are compressed between and are brought into close contact with the bottom surfaces of the corresponding annular grooves 40a and 40b formed in the respective sealing surfaces 15 and 25 of the sleeves 10 and 20 to establish perfect sealing. Thus, the space between the respective sealing surfaces 15 and 25 of the sleeves 10 and 20 are double sealed by the two concentric, circular contact areas, so that an increased number of radial flaws Kr are included in the contact areas and a sealed area between the contact areas and the sealing effect of the metallic gaskets 30a and 30b withstands a high gas pressure on the order of 150 kg/cm$^2$.

The sealing effect and sealing function of each of the metallic gaskets 30a and 30b are the same as those of the metallic gasket 30 in the first embodiment.

Since the annular grooves 40a and 40b are recessed from the sealing surfaces 15 and 25 of the sleeves 10 and 20, the bottom surfaces of the annular grooves 40a and 40b are rarely flawed after the same have been finished.

Since the metallic gaskets 30a and 30b can be located properly by simply placing the same in the corresponding annular grooves 40a and 40b of the first sleeve 10, the union joint can easily be assembled and the metallic gaskets 30a and 30b never protrude into the flow passage to obstruct the flow of the gas through the union joint.

Since the metallic gaskets 30a and 30b are placed in the annular grooves 40a and 40b, the metallic gaskets 30a and 30b can be brought into perfect sealing contact with the bottom surfaces of the corresponding annular grooves 30a and 30b by a relatively small force and, consequently, the union joint need not be formed in a very robust construction.

Since perfect sealing can be attained without excessively compressing the metallic gaskets 30a and 30b, the metallic gaskets can be used repeatedly.

The annular grooves 40a and 40b may be formed only in either the sealing surface 15 of the first sleeve 10 or the sealing surface 25 of the second sleeve 20.

Furthermore, the shape of the cross section of the annular grooves 40a and 40b need not be limited to a semicircular shape, but may be formed in any suitable shape provided that the metallic gaskets 30a and 30b can be brought into close contact with the bottom surfaces of the annular grooves 40a and 40b, respectively.

Still further, the union joint in accordance with the present invention may be provided with more than two metallic gaskets and more than two concentric annular grooves respectively for receiving the more than two metallic gaskets.

In FIGS. 6 and 7, the symbols Ao, Ai, Kc, Kr, CA and CL have the same meanings as described above concerning FIGS. 10 and 11.

Although the invention has been described in its preferred forms with a certain degree of particularity, obviously many changes and variations are possible therein. It is therefore to be understood that the present invention may be practiced otherwise than as specifically described herein without departing the scope and spirit thereof.

What is claimed is:

1. A pipe union comprising:
a first sleeve hermetically jointed to a first pipe, said first sleeve having a longitudinal axis and having first and second, radially extending, axially facing, surfaces at the outer and inner axial ends thereof, respectively;
a second sleeve hermetically joined to a second pipe, said second sleeve being coaxial with said first sleeve and having a threaded section on the exterior thereof, said second sleeve also having a third, radially extending, axially facing surface at the inner axial end thereof, said third surface being opposed to said second surface, said second and third surfaces defining sealing surfaces for preventing fluid from flowing therebetween;
a coupling nut surrounding said first and second sleeves, said coupling nut having an inside flange close to one axial end thereof and defining a fourth, radially extending, axially facing surface which is opposed to and is axially outwardly spaced from said first surface, said coupling nut also having an internal threaded portion close to the opposite axial end thereof, said internal threaded portion of said coupling nut being threadedly engaged with said threaded section of said second sleeve;
a rolling element, thrust bearing positioned between and engaging said first and fourth surfaces so that said first sleeve can be moved toward said second sleeve by rotation of said coupling nut;
at least one of said sealing surfaces having an annular groove therein concentric with said axis;
an annular, elastically expandable and contractible metallic gasket disposed between said sealing surfaces so as to be compressed therebetween when said first and second sleeves are drawn toward each other, said groove having a cross-section which corresponds to and is slightly larger than a portion of the outside circumference of the cross-section of said gasket so that said portion of said gasket is received in said groove and the outside circumference of said portion can be compressed axially and expanded radially to sealingly contact the bottom surface of said groove over an extended area of said groove when said first sleeve is moved toward said second sleeve; and
said metallic gasket being substantially C-shaped in cross-section and having a substantially constant radius of curvature, the gap in said C-shaped cross-section facing radially outwardly between said sealing surfaces, said annular groove being of substantially semi-circular cross-section with a radius of curvature which is slightly large than the radius of curvature of the portion of said gasket that is received therein so that said gasket can be elastically deformed to a substantially elliptical shape in which said gasket sealingly contacts the surface of said groove at locations close to both the radially inner and outer edge of said groove.

2. A pipe union as claimed in claim 1 wherein a said annular groove is provided in each of said sealing surfaces, said grooves being axially aligned with and opposed to each other.

3. A pipe union as claimed in claim 2 in which said metallic gasket comprises an outer shell made of a metal of relatively low hardness and a spring made of relatively hard, resilient metal and disposed inside said outer shell.

4. A pipe union comprising:
a first sleeve hermetically joined to a first pipe, said first sleeve having a longitudinal axis and having first and second, radially extending, axially facing, surfaces at the outer and inner axial ends thereof, respectively;
a second sleeve hermetically joined to a second pipe, said second sleeve being coaxial with said first sleeve and having a threaded section on the exterior thereof, said second sleeve also having a third, radially extending, axially facing surface at the inner axial end thereof, said third surface being opposed to said second surface, said second and third surfaces defining sealing surfaces for preventing fluid from flowing therebetween;
a coupling nut surrounding said first and second sleeves, said coupling nut having an inside flange close to one axial end thereof and defining a fourth, radially extending, axially facing surface which is opposed to and is axially outwardly spaced from said first surface, said coupling nut also having an internal threaded portion close to the opposite axial end thereof, said internal threaded portion of said coupling nut being threadedly engaged with said threaded section of said second sleeve;
a rolling element, thrust bearing positioned between and engaging said first and fourth surfaces so that said first sleeve can be moved toward said second sleeve by rotation of said coupling nut;
at least one of said sealing surfaces having a plurality of concentric, radially spaced-apart, annular grooves therein concentric with said axis;

a plurality of separate, concentric, annular, metallic gaskets disposed between said sealing surfaces so as to be compressed therebetween when said first and second sleeves are drawn toward each other, said grooves having cross-sections which correspond to and are slightly larger than portions of the outside circumferences of the cross-sections of said gaskets so that said portions of said gaskets are received in said grooves and the outside circumference of each said portion can be compressed axially and expanded radially to sealingly contact the bottom surface of the groove in which it is disposed over an extended area of said groove when said first sleeve is moved toward said second sleeve.

5. A pipe union as claimed in claim 4 wherein a plurality of said annular grooves is provided in each of said sealing surfaces, said grooves in the respective sealing surfaces being axially aligned with and opposed to each other.

6. A pipe union as claimed in claim 5 in which each said metallic gasket is substantially C-shaped in cross-section and has a substantially constant radius of curvature, the gap in said C-shaped cross-section facing radially outwardly between said sealing surfaces, said annular grooves each being of substantially semi-circular cross-section with a radius of curvature which is slightly larger than the radius of curvature of the portion of said gasket that is received therein so that said gaskets can be elastically deformed to a substantially elliptical shape in which said gaskets sealingly contact the surfaces of said grooves at locations close to both the radially inner and outer edges of said grooves.

7. A pipe union as claimed in claim 5 in which said metallic gaskets each comprise an outer shell made of a metal of relatively low hardness and a spring made of relatively hard, resilient metal and disposed inside said outer shell.

8. A pipe union comprising:
two sleeves having opposed end surfaces defining sealing surfaces;
a nut for moving one sleeve axially toward the other sleeve;
each of said sealing surfaces having an annular groove of arcuate cross-section therein with said grooves being axially aligned with each other;
an annular metallic gasket of substantially C-shaped cross-section disposed in said grooves and substantially filling same, the gap in said C-shaped cross-section opening radially outwardly and being disposed between said sealing surfaces, the walls of said gasket being slidable circumferentially along the walls of said grooves so that said gasket can be elastically compressed axially and expanded radially to sealingly contact the walls of said grooves over extended areas of said grooves and can sealingly contact the walls of said grooves at locations close to both the radially inner and outer edges of both of said grooves.

* * * * *

UNITED STATES PATENT AND TRADEMARK OFFICE
CERTIFICATE OF CORRECTION

PATENT NO. : 5,118,141

DATED : June 2, 1992

INVENTOR(S) : Tomio Miyashita

It is certified that error appears in the above-identified patent and that said Letters Patent is hereby corrected as shown below:

Column 8, line 21; change "large" to ---larger---.

Signed and Sealed this

Twelfth Day of October, 1993

Attest:

BRUCE LEHMAN

Attesting Officer    Commissioner of Patents and Trademarks